United States Patent
Freshour et al.

(10) Patent No.: US 6,319,406 B1
(45) Date of Patent: Nov. 20, 2001

(54) SYSTEM AND METHOD FOR REMOVING SILICONE OIL FROM WASTE WATER TREATMENT PLANT SLUDGE

(75) Inventors: Amy Rene Freshour, Putte (NL); Stephen Lan-Sun Hung, Waterford, NY (US); Bang Mo Kim, Schenectady, NY (US); Mark Allan Moses, Niskayuna, NY (US); Alan Frederick North, Mechanicville, NY (US); Don Royall Houston, Rensselaer, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/457,218

(22) Filed: Dec. 8, 1999

(51) Int. Cl.⁷ ................................. C02F 3/00; C02F 1/00; C02F 1/38
(52) U.S. Cl. ..................... 210/609; 210/770; 210/787; 210/800; 210/902
(58) Field of Search ..................... 210/609, 622, 210/768, 770, 781, 787, 800, 902

(56) References Cited

U.S. PATENT DOCUMENTS

| | | | |
|---|---|---|---|
| 4,018,673 | * | 4/1977 | Hughes . |
| 4,270,974 | * | 6/1981 | Greenfield . |
| 4,387,031 | * | 6/1983 | Prandi . |
| 4,939,087 | * | 7/1990 | Van Wie . |
| 5,076,895 | * | 12/1991 | Greenfield . |
| 5,092,983 | * | 3/1992 | Eppig . |
| 5,107,874 | * | 4/1992 | Flanigan . |
| 5,156,751 | * | 10/1992 | Miller . |
| 5,207,912 | | 5/1993 | Winter et al. . |
| 5,269,906 | | 12/1993 | Reynolds et al. . |
| 5,269,941 | * | 12/1993 | Chave . |
| 5,271,851 | | 12/1993 | Nelson et al. . |
| 5,288,391 | | 2/1994 | Biceroglu et al. . |
| 5,511,495 | * | 4/1996 | Kinto . |
| 5,690,811 | | 11/1997 | Davis et al. . |
| 6,165,946 | * | 12/2000 | Mueller . |

\* cited by examiner

Primary Examiner—Chester T. Barry
(74) Attorney, Agent, or Firm—Bernadette M. Bennett; Noreen C. Johnson

(57) ABSTRACT

A method of removing silicone oils from waste water generated by a silicones manufacturing plant including the step of centrifuging the waste water to concentrate silicone oil contaminated solids while removing the silicone oils. The silicone oil contaminated solids are then dried in a continuously mixed sludge dryer to remove more silicone oils from the sludge to form a sludge product which comprises at least 10% water and a low silicone oil concentration.

10 Claims, 5 Drawing Sheets

SYSTEM AND METHOD FOR REMOVING SILICONE OIL FROM WASTE WATER TREATMENT PLANT SLUDGE

BACKGROUND OF THE INVENTION

The invention relates to a method for removing silicone oils from sludge wastes generated by a silicone manufacturing plant. In particular, the invention relates to a method for removing silicone oils and volatile organic compounds from waste water treatment plant sludge.

Removal processes for hydrocarbon oils from refinery sludge are known. For example, U.S. Pat. Nos. 5,288,391 and 5,690,811 disclose using a solvent from a refinery unit to extract oils from sludge. However, the oil being removed is typically hydrocarbon oil. Although the extraction process may work on silicone oil sludge, potential environmental liabilities may result. Further, using a solvent previously used at a silicones manufacturing plant is not believed to be possible because the solvent may already contain high levels of silicone oils and thus may not extract oils. Therefore, fresh solvent would be needed for extraction.

Another extraction process is set forth in U.S. Pat. No. 5,271,851, which discloses a process for filtering sludge, washing the sludge with a solvent, and steam stripping the sludge to remove petroleum oils. In another process, an aerobic biomass can be used to degrade the hydrocarbon oils, as disclosed in U.S. Pat. No. 5,207,912. However, silicone oils are much more difficult to degrade. U.S. Pat. No. 5,269,906 discloses an extraction process that involves centrifuging an oily sludge stream with about 5% solids to remove the water and free oil. This step is followed by heating, for example, by indirect heat exchange to remove all of the water and oils resulting in typically bone-dry solids. This process attempts to recover all oil for reuse, and does not focus on the state of the solids remaining.

Thus, a need exists for the treatment of the solids that remain after recovery and extraction processing.

SUMMARY OF THE INVENTION

It is desirable to utilize a method for removing silicone oils from waste water treatment plant (WWTP) sludge in a silicones manufacturing plant, such that the resulting sludge cake can be a handleable, non-dusty sludge cake. It is also desirable that the process removes a significant amount of volatile organic compounds (VOCs) from the sludge.

One aspect of the present invention is to produce an acceptable sludge cake having a low oil concentration and at least 10% water in order to avoid a dust problem when handling the sludge. If the sludge laden with silicone oils is dried completely, some high boiling silicone oils still remain on the solids, making the resulting solids water resistant and difficult to rewet. Additionally, the solids are fine and will dust when dried.

Another aspect of the present invention is to remove not only silicone oils from the sludge, but also to remove volatile organic compounds (VOCs) that are commonly found in the waste water of silicones manufacturing plants.

As embodied by the invention, silicone oils can be removed from process sewer sludge through a specific process sequence of first adding biosolids to the waste water at low pH to reduce the biosludge volume and increase the solids to oil ratio; centrifuging the waste water to dewater the sludge and concentrating the silicone oil contaminated solids, while removing a fraction of the silicone oils from the solids which allows a higher oil removal before the cake becomes too dry; and finally removing more silicone oils from the solids through a drying process. The heating process must be controlled and mixing must be involved to ensure that spot drying does not occur. The silicone oils will not be recovered for reuse.

BRIEF DESCRIPTION OF THE DRAWINGS

Other features and advantages of the invention will become apparent from the following description of embodiments of the invention, which refers to the accompanying drawings, wherein.

DETAILED DESCRIPTION OF THE INVENTION

Figure 1:
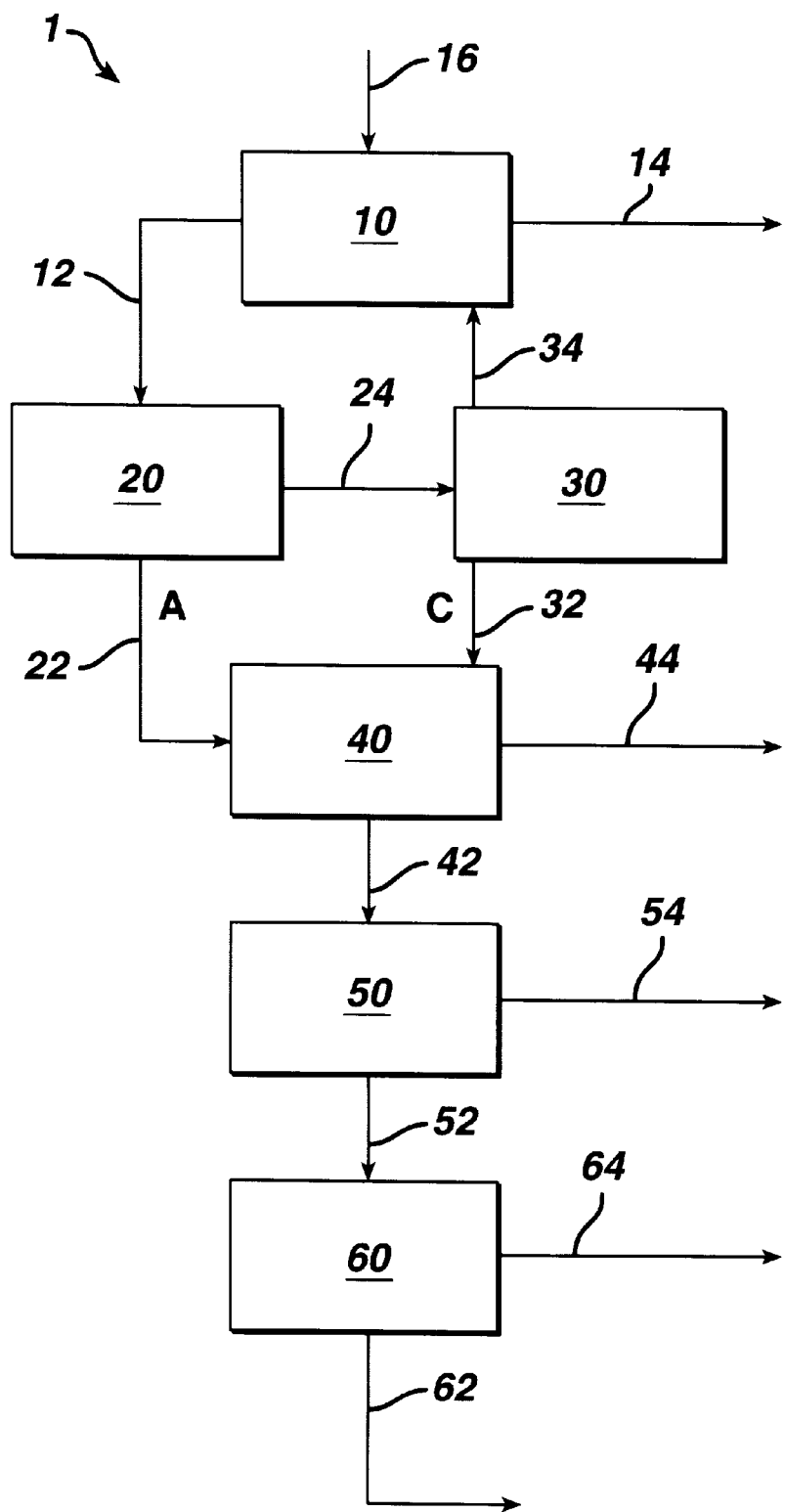
FIG. 1 is a block diagram illustrating a system to implement a method, as embodied by the invention.

FIG. 1 is a block diagram of an exemplary silicones manufacturing plant 1. Silicone oils may enter into a waste water treatment plant (hereinafter "WWTP") 10 at the silicones manufacturing plant 1 with particulates and other trace chemicals incorporated therein. The waste water, which can originate from various parts of the silicones manufacturing plant 1, is collected by a process sewer collection system. Once the process sewer waste water is collected at the WWTP 10, a number of processing steps treat the waste water so that the water may be properly discharged, for example discharged at conduit 14. The invention is described hereinafter with respect to a silicones manufacturing plant 1 and the extraction and removal of oils, however, this description is merely exemplary and is not intended to limit the invention in any manner.

The process sewer waste water 12 from a silicone manufacturing plant 1 may include free silicone oils. These oils can be removed through a gravity oil separator 20, such as, but not limited to, an API separator, plate separator, or corrugated plate separator. Although gravity oil separators can be effective for removing droplets of free oil from the waste water, it is not effective for removing extremely small droplets of oil, for example, droplets having diameters less than about 0.006 cm. Further, gravity oil separators typically cannot separate the silicone oils from the solid particulate to which much of the silicone oils are attached. In addition to separating the oils from waste water, the gravity oil separator 20 can also concentrate the solids in its bottom flow 22. At a silicones manufacturing plant 1, the solids in the bottom flow 22 may also contain silicone oils, which are attached to the solids.

Generally, a commercial filter press is used to filter solids from both the bottom flow 22 and a clarifier bottom flow 32 (to be described hereinafter). To prevent filter fabric in a filter press from being blinded by silicone oils, a separate solids stream, which could otherwise be directed to a reclaimer, is added to function as a filler to alter an oil to solids ratio. For example, it is estimated that the filler can account for about 80% of the total filter cake generated by a plant. Once mixed with the oily sludge, the filler material is no longer acceptable to a reclaimer. However, if the silicone oils can be separated from the plant sewer sludge prior to the filter press, the process sewer sludge, as well as the filler material used currently as the filter aid, can potentially be sent to concrete, cement, or asphalt manufacturers.

After being transmitted through the gravity oil separator 20, a single process step, and alternatively a series of process steps, can be employed to collect finer solids from the waste water. One arrangement, as embodied by the invention, comprises concentrating finer solids with a clarifier 30. Using a clarifier 30, the solids, which are laden with silicone oils, are then concentrated in a clarifier bottom flow 32. If the silicones manufacturing plant 1 comprises both a gravity oil separator 20 and clarifier 30, then both the bottom flow 22 and the bottom flow 32 may comprise solids, which may contain contaminated silicone oils. The method, as embodied by the invention, treats the materials in the bottom flows.

As illustrated in FIG. 1, the bottom flows 22 and 32 are combined at manifold 40. The solids can be further concentrated by an addition of a thickener in the manifold 40. Following the thickener addition, the thickener supernatant (often known as a "slurry") passes from conduit 44. Although a gravity thickener is described above, it is merely exemplary, not intended to limit the invention, and other types of thickeners are within the scope of the invention. Also, although a thickener can be used to further concentrate the solids to decrease the flow rate of the slurry, the method, as embodied by the invention, may not need the thickener depending on the nature of the slurry.

The thickened slurry is then centrifuged. The bottom flow 42 from the manifold 40 passes to a centrifuge 50. The centrifuge concentrates and dewaters the solids, and also exposes the silicone oil laden slurry wastes to centrifugal forces. The centrifuge 50 then can release some of the silicone oils from the solids. This oil can then be removed with concentrate at conduit 54. Although the above-description sets forth a decanting centrifuge, this description is merely exemplary and is not intended to limit the scope of the invention. The method, as embodied by the invention, can employ other types of centrifuges, such as, but not limited to, an automatic or manual discharge imperforate basket centrifuge. The centrifuge should subject the slurry to a G-force of at least about 740 g's. Higher G-forces, such as those provided with higher revolutions per minute of the centrifuge can be used to reduce the time for separation at the centrifuge 50.

Following the centrifuging action, any free oils can be removed with the centrate through conduit 54. The oils can be separated from water using standard water-oil separation technologies, such as, but not limited to, API separators and dissolved air flotation. The resulting and remaining centrifuge sludge cake is removed in the direction of arrow 52, although the sludge cake is laden with silicone oils. Typically, the sludge cake 52 might contain solids in a range from about 10% to about 30%, with a balance comprising moisture and silicone oils. Other methods of concentrating solids may not be as effective as centrifuging because of the high silicone oils level. As described above, filters used therein may become blinded, decanters may not be able to obtain an adequate solids concentration, and hydrocyclones may not have sufficient G-force to remove silicone oils from particulates.

Although some silicone oils are removed by the centrifuge 50, some oil may remain and the amount may be high enough to impair filtration thereof. Accordingly, following the centrifuging, the sludge cake 52 may be moved into a sludge dryer 60 to remove in the direction of arrow 64 the water vapor, silicone oils, and residual VOC's. The dryer may operate in a temperature range from about 80° C. to about 100° C. Drying at temperatures above about 100° C. may cause difficulty in controlling a moisture content of the final sludge, and drying at lower temperatures may increase a time needed in the sludge dryer 60 for a desired drying level. As described above, a moisture level of about 10% of the final sludge weight, in the final sludge cake should be sufficient to prevent dusting.

Sludge drying may be done in continuously mixing sludge dryers. Standard "batch"dryers may not be suitable because they may cause uneven drying of the sludge cake, so that part of the sludge cake becomes very dry while other parts remain undesirably wet. Very dry sludge may dust and be hard to handle. A suitable dryer for the method, as embodied by the invention, may rotate or move the sludge cake during the drying so that uniform drying may occur. Various sludge dryers are within the scope of the invention, however, the dryer may also use indirect heating. The source of heating can comprise any source of heating, such as, but not limited to, steam, electrical, or gas-fired heating. Further, the operating pressure of the dryer can be at or near atmospheric pressure. Alternatively, other pressures, which are dependent on the nature of the dryer itself are within the scope of the invention.

The oil-free water may exit the clarifier 30 through conduit 34 and may require further treatment for other contaminants, such as, but not limited to, VOCs. One such further method treatment, as embodied by the invention, comprises biodegradation. For example, the biodegradation, as embodied by the invention, provides bacteria for treatment, in which generated and added biosolids should be removed at a rate sufficient for facilitated growth of new biosolids. The waste biosolids may be added to the sludge, for example at port 16. When the biosolids are added to the oily solids previously collected from the silicones manufacturing plant 1, an oil to solids ratio will decrease, thus allowing the sludge to be handled easier. Additionally, the biosolids can be dried to lower moisture levels without creating undesirable dusting, compared to other solids in the sludge. As an alternative to the above positioning of port 16, the biosolids can be added with the thickener or at the centrifuge 50. The biosolids may not centrifuge well and thus may require longer heating to remove water trapped in the sludge. Since biosolids contain a relatively large amount of water, it is best to rupture biosolid cells before continued treatment to enhance water removal. This rupturing has an added advantage of eliminating odor. The biosolids can be added under acidic conditions to enhance any rupturing of the biosolid cells.

A plurality of tests was performed to demonstrate the method, as embodied by the invention. In the tests, the slurry samples were collected from an actual silicones manufacturing plant. The sludge was collected at an API bottom flow (denoted as A in FIG. 1) and a clarifier bottom flow (denoted as C in FIG. 1). The samples were either collected as one large sample on one day (in those sample denoted with "1") or as a combination of samples collected over one week. A third sample, which comprises a combination of the bottom flows from the separator and clarifier, was also taken over a one week period.

The samples were mixed well for 2 hours to obtain homogeneity therein. The samples were then divided and analyzed to determine the oil concentration of the sludge.

The results of the tests will be discussed below with reference to Examples. These Examples are not intended to limit the invention in any manner, and are provided to demonstrate the methods, as embodied by the invention. The measurements and values set forth in the following Examples are approximate, unless otherwise indicated.

EXAMPLE 1

In the tests, a laboratory centrifuge was used to simulate the actions of a commercial centrifuge on the silicone oil-contaminated slurry. Because commercial decanting centrifuges can typically generate more G-forces than a laboratory centrifuge, these tests results are believed to be conservative. Higher silicone oil removal efficiencies are expected in full-scale implementation.

Samples were added to vials and centrifuged at about 2000 rpm for about 1 minute. This corresponds to a G-force of about 740 g's. The liquid layer was removed, for example by pouring off, and the remaining sludge was analyzed for oil concentration. The percent oil removed is up to about 18%. The percentages are based on an average oil concentration of the sample previously analyzed. Table I lists a percent reduction in silicone oil of a slurry waste by centrifuging and removing the centrate for various waste streams and combinations of waste streams.

TABLE I

| Sample | Oil Removed by Centrifuging (%) |
|---|---|
| C-1 | 12 |
| C-1 | 18 |
| C-1 | 13 |
| C-1 | 11 |
| C-1 | 15 |
| C-12/2 | 0 |
| C-12/29 | 4 |
| A-12/2 | 11 |
| A-12/29 | 11 |
| AC-12/8 | 12 |

EXAMPLE 2

Figure 2:
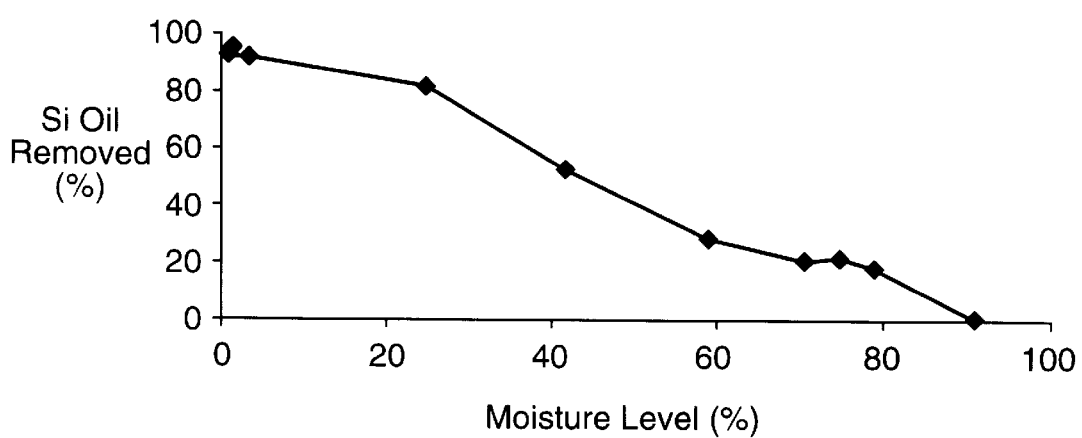
FIGS. 2–5 are graphs representing data that illustrate percent reduction in moisture content and silicone oil concentration of sludge samples after centrifuging and drying, as embodied by the invention.

Several samples identical to sample C-1 were centrifuged at about 2000 rpm for one minute and the liquid layers were poured off. All of the vials containing the remaining sludge were placed in a dryer at about 150° C. One vial was removed at timed intervals until all vials were removed. The moisture content and oil concentration of each vial was analyzed and tabulated. The results are provided in Table II and FIG. 2, said figure being a graph that illustrates that at about 20% moisture remaining, over about 80% of the silicone oil has been removed.

TABLE II

| Heating Time (min) | Moisture (%) | Si Oil Removed (%) |
|---|---|---|
| 10 | 79 | 18 |
| 20 | 75 | 21 |
| 30 | 71 | 21 |
| 40 | 59 | 29 |
| 50 | 42 | 52 |
| 60 | 25 | 82 |
| 120 | 1 | 92 |
| 240 | 3 | 92 |
| 1200 (overnight) | −1 | 92 |
| 1200 (overnight) | 1 | 94 |

EXAMPLE 3

Figure 3:
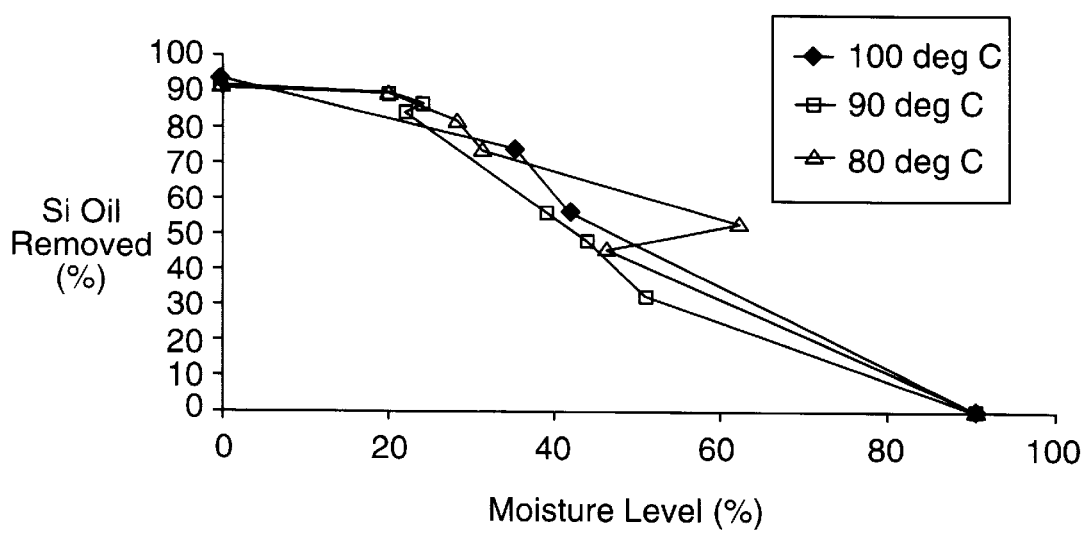

The test was repeated using sample C-1, with heating to different temperatures. The data is plotted in FIG. 3, in which the graph illustrates that at about 20% moisture, there is more than about 80% oil removal at all temperatures. However, lower temperatures may be desired because control the resulting moisture content may be enhanced.

EXAMPLE 4

Figure 4:
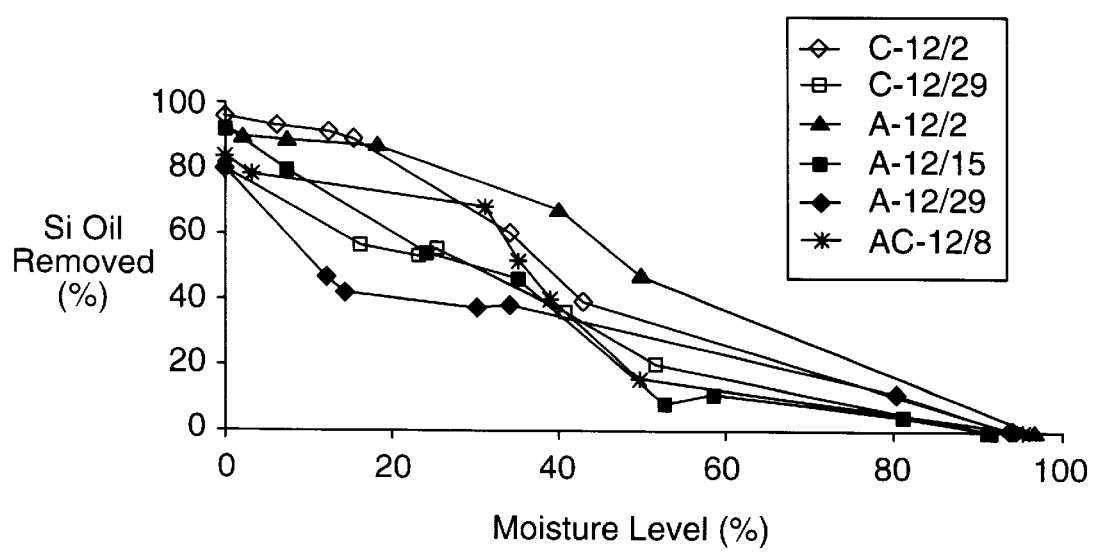

Sludge samples were collected over several days and were tested in a similar fashion as above. A similar procedure was as in Example 2, with the heating 90° C. The samples were collected over a long period of time to be representative the variety of oils and concentrations that may occur. The data is plotted in FIG. 4. AS can be seen from the graph, high values of silicone removal were observed in samples with adequate moisture levels remaining. The oil removal can be due to the variety of oils processed at the plant, some of which have higher boiling points and may not be removed at these temperatures.

EXAMPLE 5

Figure 5:
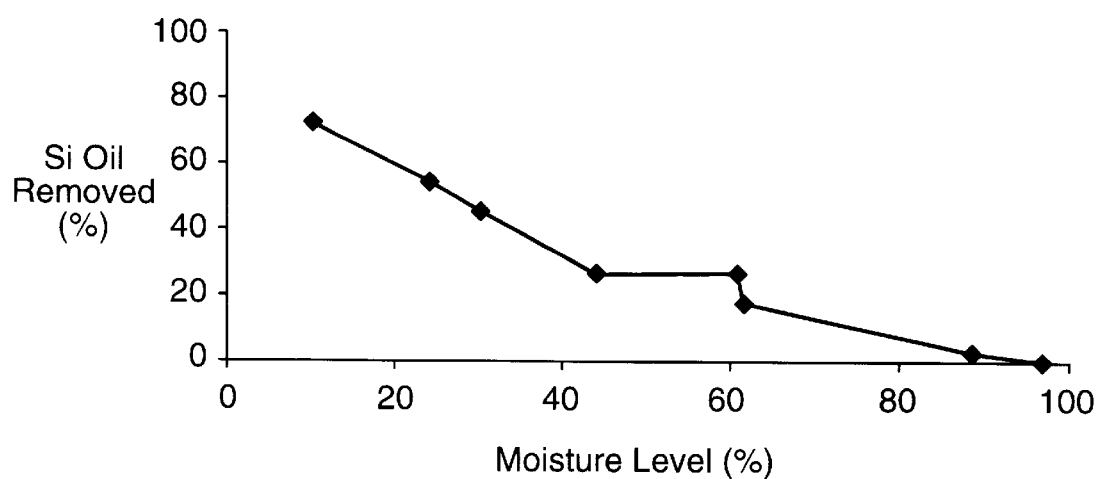

A test was conducted where live biosolids were added to sample C-1, such that about 50% of the solids were biosolids and about 50% were clarifier solids. Addition of the biosolids, for example at the beginning of the waste water treatment facility, will contribute to the amount of solids seen in the centrifuge and dryer. Therefore, the concentration of oil to solids can be cut in approximately half. The mixed sludge was processed by centrifuging and drying at about 90° C. The results are plotted in the graph of FIG. 5, which demonstrates that oil removal at about 20% moisture is similar to an average removal of Example 4. Additionally, the biosolids may comprise a different content than the other WWTP solids, which allows the sludge to be further dried without creating dusting.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. A method of removing silicone oils from silicone oil-containing waste water, the method comprising:

adding biosolids to the waste water to reduce biosludge volume;

centrifuging the waste water to concentrate silicone oil contaminated solids, the centrifuging the waste water removing silicone oil from the waste water;

drying the silicone oil contaminated solids to remove silicone oil therefrom; and forming a sludge product that comprises at least 10% water.

2. A method of removing silicone oils from silicone oil-containing waste water, the method comprising:

adding biosolids to the waste water to reduce biosludge volume;

centrifuging the waste water in a centrifuge to a force of at least 740 G's, thereby forming a centrifuge sludge product comprising silicone oil contaminated solids and a phase comprising silicone oil;

drying the silicone oil contaminated solids to remove silicone oil therefrom; and forming a sludge product that comprises at least 10% water.

3. The method according to claim 2, wherein the step of adding biosolids comprises adding the biosolids at an influent of a waste water treatment plant to rupture cells of the biosolids for the ease of water removal.

4. A method of removing silicone oils from silicone oil-containing waste water, the method comprising:

centrifuging the waste water in a centrifuge to a force of at least 740 G's, thereby forming a centrifuge sludge product comprising silicone oil contaminated solids and a phase comprising silicone oil;

forming a sludge product that comprises at least 10% water; and removing free oils and centrate from the centrifuge.

5. A method of removing silicone oils from silicone oil-containing waste water, the method comprising:

separating free silicone oils from the waste water in a gravity oil separator;

centrifuging the waste water in a centrifuge to a force of at least 740 G's, thereby forming a centrifuge sludge product comprising silicone oil contaminated solids and a phase comprising silicone oil; and forming a sludge product that comprises at least 10% water.

6. The method according to claim 5, further comprising the step of concentrating finer solids from the separator in a clarifier.

7. The method according to claim 6, further comprising the step of passing silicone oil contaminated solids from bottom flows of the separator and clarifier to a thickener.

8. The method according to claim 7, further comprising the step of thickening the bottom flows in the thickener prior to centrifuging.

9. The method according to claim 4, wherein the drying step comprises drying the centrifuge sludge product in a continuously mixed sludge dryer.

10. The method according to claim 9, wherein the drying step comprises drying the centrifuge sludge product by indirect heating.

* * * * *